H. MICHELS & F. L. LAMOREAUX.
SAW FILING MACHINE.
APPLICATION FILED APR. 28, 1913.

1,097,252.

Patented May 19, 1914.
4 SHEETS—SHEET 2.

WITNESSES
Robert N. Van Deusen
Virginia C. Spratt.

INVENTORS
Harry Michels
Frank L. Lamoreaux
BY
Ralgemond A. Parker.
ATTORNEY

H. MICHELS & F. L. LAMOREAUX.
SAW FILING MACHINE.
APPLICATION FILED APR. 28, 1913.

1,097,252.

Patented May 19, 1914.
4 SHEETS—SHEET 3.

UNITED STATES PATENT OFFICE.

HARRY MICHELS AND FRANK L. LAMOREAUX, OF DETROIT, MICHIGAN.

SAW-FILING MACHINE.

1,097,252. Specification of Letters Patent. Patented May 19, 1914.

Application filed April 28, 1913. Serial No. 763,957.

*To all whom it may concern:*

Be it known that we, HARRY MICHELS and FRANK L. LAMOREAUX, citizens of the United States, residing at Detroit, county of Wayne, State of Michigan, have invented a certain new and useful Improvement in Saw-Filing Machines, and declare the following to be a full, clear, and exact description of the same, such as will enable others skilled in the art to which it pertains to make and use the same, reference being had to the accompanying drawings, which form a part of this specification.

This invention relates to saw-filing machines and has for its object a machine that automatically advances the saw and files the tooth.

A further object is a saw-filing machine which files the saw in a manner that saws are filed by hand, namely it files the front of the tooth first and then the back so that the point of the tooth is left turned over front, in a position to more efficiently cut.

A still further feature is the provision of detachable means which may be used to bring the teeth into proper relation with the file in saws whose teeth are not evenly spaced.

Another feature is the provision of means for positively maintaining the file against the tooth so that the teeth will always be uniformly filed.

These several advantages and features will more fully appear in the description hereinafter following.

Figure 1:
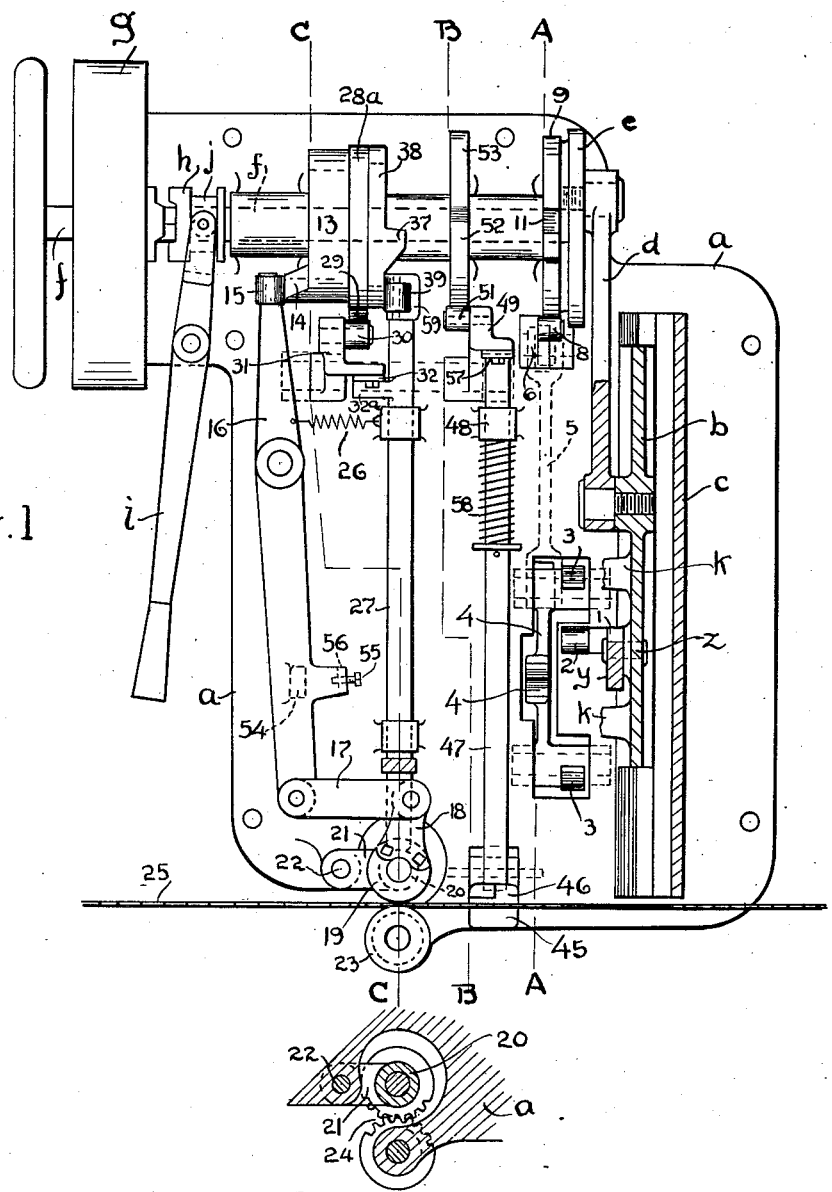
Figure 2:
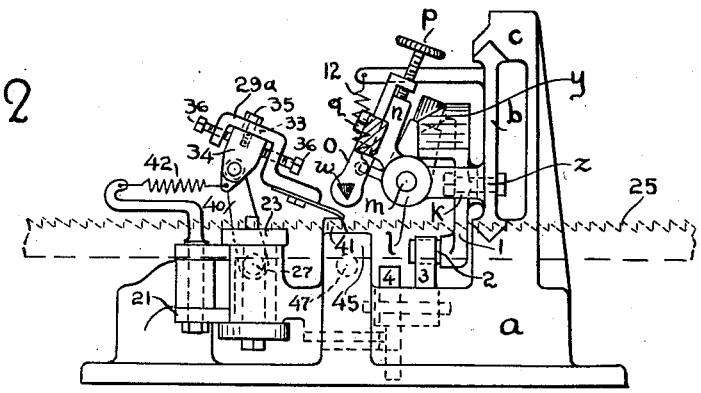
Figure 12:
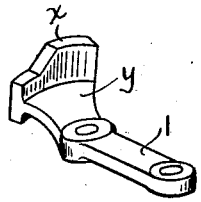
Figure 10:
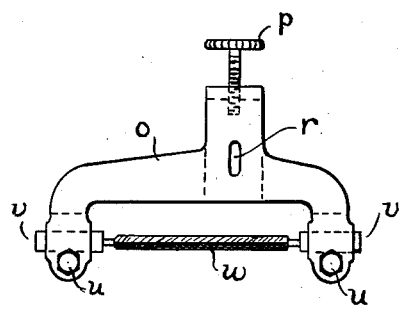
Figure 9:
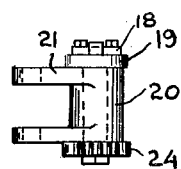
Figure 11:
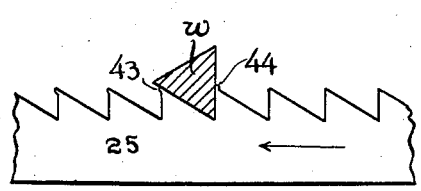
Figure 3:
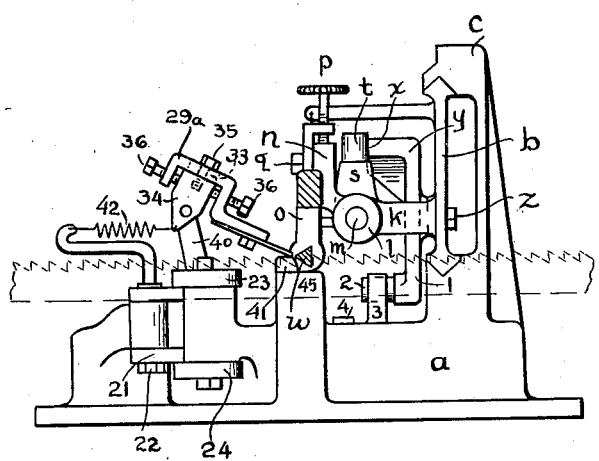
Figure 5:
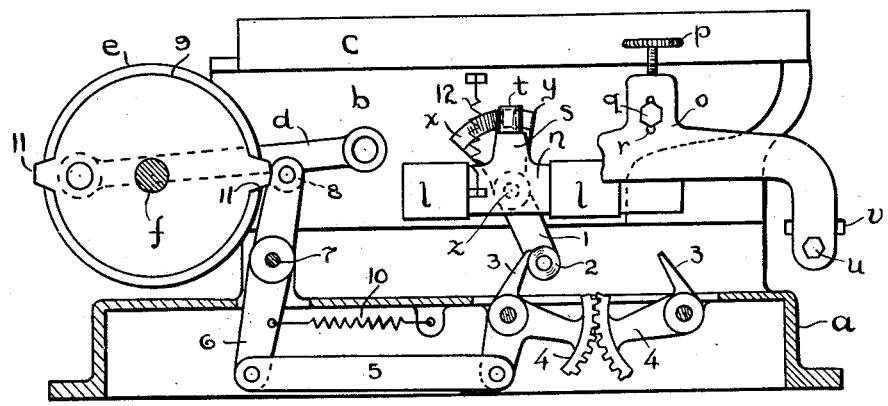
Figure 4:
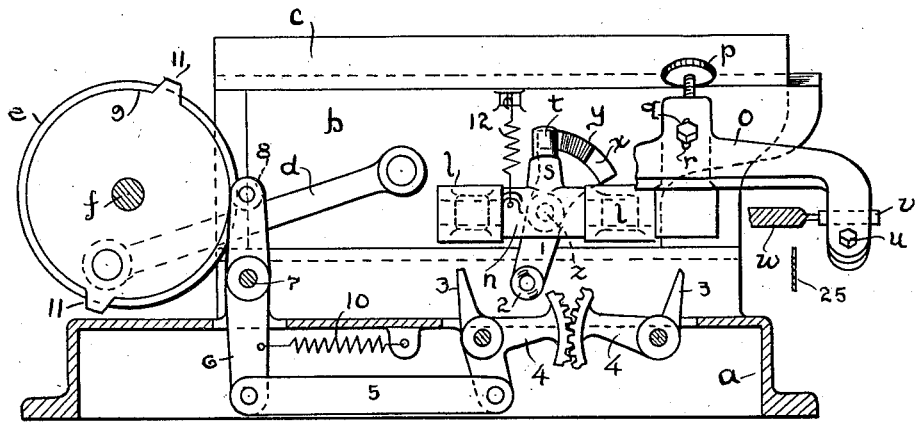
Figure 6:
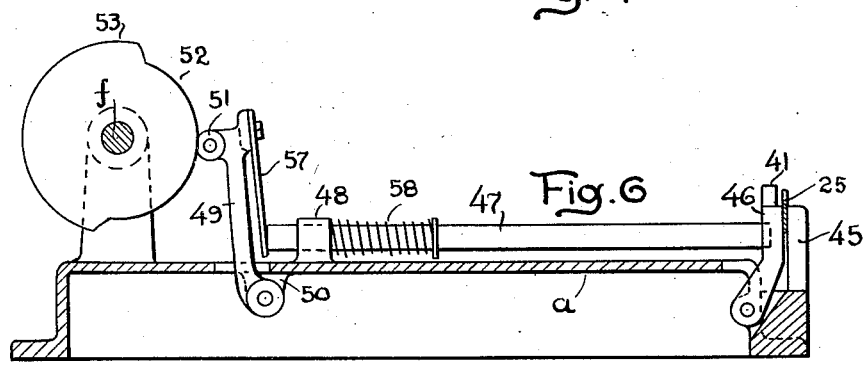
Figure 7:
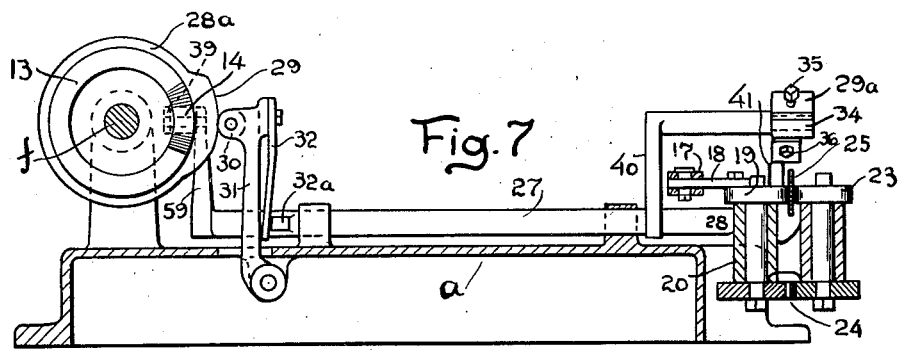

In the drawings:—Figure 1, is a top plan view of the machine partly in section. Fig. 2, is an end elevation, showing the file lifted to allow the advance of the saw. Fig. 3, is a similar view of the machine, showing the file engaging the saw. Fig. 4, is a section taken on the line A—A of Fig. 1 and viewed from the left, some of the parts are broken away to show parts behind. Fig. 5, is a similar view showing the parts in position to hold the file against the saw, as shown in Fig. 3. Fig. 6, is a section on the line B—B of Fig. 1, viewed from the left. Fig. 7, is a section on the line C—C of Fig. 1, viewed from the left. Fig. 8, is a cross section through the feed rolls. Fig. 9, is a detail elevation of one of the feed rolls which is provided with an oscillatory supporting bearing. Fig. 10, is a detail in elevation of the file and file carrier. Fig. 11, is a detail showing how the file leaves the point of the tooth turned over forward by filing first the front of the tooth and then the back. Fig. 12, is a detail in perspective of the cam that brings the file into and withdraws it from engagement with the saw.

*a*, is the casting which forms the base of the machine. This is formed to provide the necessary supports and bearings for the devices and shafts which will be hereinafter described. Inasmuch as the proper formation of this casting, to provide the necessary bearings and supports, is a matter of mechanical skill, these need not be described in detail.

There is substantially five actions requiring five sets of mechanism in this machine, namely, the reciprocation of the file and the mechanism to perform this function; the bringing of the file into operative relation with the saw and the mechanism which works in connection with the reciprocating mechanism to effect this; the feeding of the saw and the mechanism that effects this; the proper adjusting of the feed when the teeth are unevenly spaced, and the mechanism that operates in connection with the feeding mechanism to accomplish this; and the vising of the saw during the filing operation. These operations and mechanisms will be described in order.

First, the reciprocation of the file: This is effected by a slide $b$ which reciprocates horizontally in the guide $c$, formed in the casting $a$ (Fig. 1). This slide is reciprocated by the connecting rod $d$ that is pivoted to the crank disk $e$. This crank disk $e$ is on the end of a shaft $f$ which will be designated as the cam shaft, as upon it are mounted almost all the cams which operate the various sets of mechanism. A pulley wheel $g$ is mounted to rotate freely upon the end of this cam shaft $f$, but it may be brought into driving relation with the shaft by shifting one of the clutch parts of the jaw clutch $h$ along the square portion of the shaft. This may be accomplished by throwing the lever $i$, which is pivoted to the base $a$ and which has a bifurcated end that straddles the annular race $j$ of the clutch part $h$.

Referring to Figs. 2 and 3, it will be seen that the slide $b$ is provided with arms $k$ which have bearings $l$. There are two of these arms $k$ (Fig. 1). Within these bearing sleeves $l$ rotatably fit the pin-like ends $m$ of the swinging head $n$. The swinging head $n$ supports the file carrier $o$ which is adjustable upward or downward with respect to the swinging head by the hand-screw *p*. The swinging head and the file carrier are connected by a bolt *q* (Figs. 2 and 3) that passes through the slot *r* (Fig. 10). This bolt must first be loosened before the hand-screw *p* can be operated to adjust the two parts relatively. The file carrier *o* is shown in detail in Fig. 10 and it comprises a yoke with split bearings at each end of the yoke that may be loosened by loosening the bolts *u*. These split bearings each hold a block *v* into the ends of which the ends of the file *w* may be inserted and held. The swinging head *n* has an upright *s* that journals a roller *t*. This roller *t* travels across the irregular face *x* (Fig. 12) of the cam *y*. This cam *y* is pivoted by the pin *z* to the slide *b* (Fig. 1). The cam *y* has a depending arm 1 (Fig. 5) that carries an antifriction roller 2. This is adapted to engage against the trips 3 that are attached to the gear segments 4. These segments are pivoted to the base, as shown in Fig. 5 and mesh with each other. The segment to the left in Fig. 5 has an arm that is connected by the link 5 with the lever arm 6 that is pivoted at 7 to the base *a*. The end of the lever arm 6 carries an antifriction roller 8 which is caused to follow the surface of the cam 9 by the pull of the spring 10. The cam 9 will be designated the trip-setting cam, for that is its operation and the cam *y*, the trips and the connectors, with the trip-setting cam 9, will be designated the file-setting cam mechanism, for such is its purpose. This trip-setting cam 9 is provided with a pair of diametrically opposed raised portions 11. It is these that every half revolution of the cam 9 set the trips 3 in the path of the roller 2 (compare Figs. 4 and 5).

It is to be borne in mind that the cam *y* reciprocates back and forth horizontally with the slide *b*. In the position shown in Fig. 4, the roller *t* of the swinging head *n* is on the low portion of the irregular face *x* of the cam. It is maintained in engagement with the face *x* by the pull of the spring 12 (Figs. 4 and 5). When in this position (Fig. 4) the file-carrier is lifted and the file *w* is out of contact with the saw (Fig. 2). In Fig. 5, the slide *b* is shown at the extreme left of its travel. One of the raised portions 11 of the trip-setting cam 9 has set the trips 3 so that the left end one engages with the anti-friction roller 2. This forces the high portion of the face *x* of the cam *y* in engagement with the anti-friction roller *t*, thereby tipping the swinging head and the file-carrier *o* forward. This brings the file *w* in between the two teeth that are directly under the file (Fig. 3). The cam *y* remains in this position for half a revolution of the trip-setting cam 9 or, that is, until the slide reaches the extreme right of its travel, (when considered in connection with the view of Fig. 5). At the extreme right of the slide's travel, it will be obvious that the trips 3 are again set, as shown in Fig. 5, and that the cam *y* will be thrown to bring the low part of the cam in engagement with the antifriction roller *t*. This will allow the spring 12 to lift the swinging head and file-carrier and lift the file *w* out from between the teeth. This occurs at the beginning of the return stroke of the file and it is during this return stroke that the saw feeding device comes into operation. Emphasis is laid upon the arrangement of the file-setting mechanism by which the file is positively maintained against the tooth as contradistinguished from being yieldably maintained. This is a distinct advantage as it insures a uniform filing of the teeth. It cannot be accomplished by a yieldable engagement.

The saw-feeding mechanism comprises (Fig. 1) a saw-feeding-cam 13 fast to the cam shaft *f* and which has a single raised portion 14 on its side. This engages with the anti-friction roller 15 on the end of the lever 16 which is pivoted to the base *a*. This antifriction roller 15 is caused to follow the face of the cam by reason of the pull of the spring 26 upon the lever 16 (Fig. 1). The end of the lever 16 is linked by a link 17 to the crank 18 which is bolted to the top of the feed roll 19 (Figs. 1 and 7). This roll 19 is mounted to oscillate upon its own center and also upon a second center exterior of the roll by means of an oscillatory bearing sleeve 20 (Fig. 9). This oscillatory bearing sleeve 20 is provided with a pair of arms 21 which are pivoted by the pin 22 (Fig. 8) to the casting. Mounted on another bracket portion of the base *a* is a second feed roller 23 (Fig. 7). These rollers feed together by reason of the meshing gears 24, one fastened to the bottom of each roller (Figs. 7 and 8).

By reason of the oscillatory bearing sleeve 20, the roll 19 is differently spaced from the roll 23 at different times. When the raised portion 14 of the cam 13 assumes the position shown in Fig. 1 and engages with the anti-friction roller 15 of the lever 16, the feed roll 19 is rotated. The feed rolls are caused to bear against the saw 25 (Fig. 7) by the shifting of the rock-shaft 27 along in its bearings and bringing the end 28 against the oscillatory bearing sleeve 20. This is a yieldable forcing of the feed roll 19 in contact with the saw, so as to accommodate the feed rolls to varying conditions of the saw. This yieldable shifting of the rock-shaft 27 along its bearings is effected by the operation of the cam 28ª (Fig. 7). This cam 28ª will be termed the feed-roll-adjusting-cam. It has a raised portion 29 that is engaging with the anti-friction roll 30 of the rock-arm 31 in the condition of the operating parts, as shown in Fig. 7. The rock-arm 31 is pivoted to the base a. This rock-arm 31 carries a stiff flat spring 32 whose end engages with a lug 32ª of the rock-shaft 27. It is clear that the rocking of the rock-arm 31 to the right in Fig. 7, by the raised portion 29 of the cam coming into engagement with the anti-friction roll 30, shifts the rock-shaft 27 to the right in its bearings and thereby yieldably forces the feed roll 19 into more intimate contact with the saw.

An additional feed device in the nature of a feed-corrector is furnished in the dog 29ª (Figs. 2 and 3). This dog 29ª is fastened to the head 34 by the screw 35 which protrudes through a slot 33 in the dog (Figs. 2 and 3). This allows of the adjusting of the dog with respect to the head by the set screws 36. The function of the dog 29ª is to move the saw teeth back each time to a given position with respect to the file w. It is only necessary to use the feeding dog when the teeth of the saw 25 are unevenly spaced, which is a common condition when the saw has been hand filed. It will readily be understood that the feed rolls can be made to advance the saw just a little farther each time than would be the farthest space between two teeth, then the feeding dog comes into operation directly after the feed rolls, as the raised portion 37 of the cam 38 is slightly behind the raised portion 14 on the cam 13 in the cam set shown in Fig. 1. It will be noted in Fig. 1, that the high part 37 of the feed dog cam engages with the antifriction roller 39 on the pawl rock-shaft 27. This antifriction roller 39 is connected to the shaft 27 by a rock-arm 59 (Fig. 7) which can rock the shaft and the shaft rocks the rock arm 40 to which the head 34 is pivoted. This forces the dog, as shown in Figs. 2 and 3, to the right. The tip of the dog is held out of the path of the saw by the block 41 until the dog is forced to the right. The pull of the spring 42 yieldingly holds the tip of the dog in engagement with the teeth of the saw when the dog is forced over to the right of Fig. 2 or 3. This spring also serves to yieldingly turn the rock-shaft 27 so that the anti-friction roller 39 will follow the irregularities of the face of the feed-dog cam 38. As already explained the protruding of the tip of the dog may be varied by the adjustment of the set-screws 36. This accords it with whatever condition is met with.

When the teeth in the saw 25 are new and therefore regularly spaced or when they have been filed by a saw-filing machine so that they are not unequally spaced, the feed dog and the head may be pulled off from the wrist pin on the rock arm 40 and the machine operated without the feed dog. This is optional. Heretofore it has been customary to feed the saw by feed dogs and it has been found necessary to always feed them backward or otherwise the feed dog could not engage the teeth to force the saw along. By the provision of the rollers alone, or the rollers in conjunction with the feed dog, there is afforded to this machine a forward feed which has very material improved results, for it allows the filing of the saw in the manner shown in Fig. 11, that is, the back of the tooth is the last portion filed and the points 43 of the teeth are turned over forward in which position they are best adapted to cut into the wood. This is the way saws are hand filed. In machine filing heretofore, the backs of the teeth have been first filed and then the fronts. This results in a back-turned point, as shown at 44.

The last operation and the last mechanism to be described is the automatically operated vise. This comprises a pair of jaws, one of which is stationary (Fig. 6) and is lettered 45 and the other of which is pivoted and is characterized as 46. In the end of the jaw 46 is fastened a push-rod 47 that is slidable in the bracket 48. A rock arm 49 is pivoted to the bracket 50 of the base a and carries on its free end an antifriction roller 51. This antifriction roller 51 bears against the periphery of a cam 52, one-half of whose periphery is raised as at 53. This cam will be designated, the vising-cam. On the side of the rock arm 49, opposite the antifriction roller 51, is a stiff flat spring 57 that bears against the end of the rod 47. This tends to yieldingly force the jaw 46 into engagement with the saw 25 when the rock rod 49 is rocked by the high portion 53 of the cam 52. A spiral spring 58 affords the spring action necessary to keep the antifriction roller 51 in contact with the periphery of the vising-cam 52. Inasmuch as the raised portion 53 is just behind the raised portion 37 of the feed dog cam (Fig. 1) the vising takes place immediately after the feed-dog has operated and the vising is maintained during one-half of the revolution or while the file w is moving across the blade of the saw.

54 (Fig. 1) represents a lug raised upon the surface of the casting a, that operates in conjunction with the set screw 55 held by the depending lug 56 of the lever arm 16. These lugs and set-screw form an adjustable stop to regulate the feed. By turning the set-screw 55 farther in than shown in this view, the anti-friction roller 15 can be prevented from contacting the low portion of the feed roll cam 13. In fact it may be held from the low portion of the cam any desired distance within the small range of adjustability. This, therefore, regulates the travel of the lever 16 and hence the actuation given to the feed rolls. The feed rolls, therefore, may be accurately adjusted to accord with the spacing that happens to occur between the teeth of the particular saw being filed.

What we claim is:—

1. In a saw-filing machine, the combination of means for feeding the saw forward a given distance at each operation, a second feeding device for insuring the presence of two adjoining teeth at the same point at each operation of the first mentioned feeding means regardless of the spacing between the teeth and means operating between the feeding operations for automatically filing the saw teeth, substantially as described.

2. In a saw-filing machine, the combination of means for feeding the saw forward a given distance at stated periods, a feeding dog operating to push the saw back to a given point each time so that the two feeding devices bring the saw teeth at the same point each time regardless of the irregular spacing between teeth, and automatic means for filing the saw teeth between the complete feeding operations, substantially as described.

3. In a saw-filing machine, the combination of means for feeding the saw forward a given distance at stated periods, a feeding dog operating to shove the saw back to bring the teeth at a given position each time regardless of the irregular spacing between the teeth, means for adjusting the dog to regulate the push backward of this member and automatic means for filing the saw teeth between the feeding operations, substantially as described.

4. In a saw-filing machine, the combination of automatically operated feed rolls for feeding the saw forward a given distance at stated periods, a feeding dog for shoving the saw backward to a given position each time after it has been fed by the rolls, an oscillatory bearing for one of the feed rolls, a rock rod connecting with the feed dog, means for rocking the rock rod, means for yieldably shifting the rock rod lengthwise to engage with the oscillatory bearing of the feed roll so that the feed rolls may grip the saw, and means for automatically filing the saw during intervals between feeding operations, substantially as described.

5. In a saw-filing machine, the combination of means for feeding the saw forward a given distance at stated periods, means for governing the feed for saws having unequal spacing between the teeth, comprising a feeding dog, a raised block upon which said feed dog is held normally out of engagement with the saw, means for forcing the feed dog over said raised block at stated periods to allow it to drop into engagement with the saw teeth and move the saw backward on it to a given point, and means for automatically filing the saw during intervals between feeding operations, substantially as described.

6. In a saw-filing machine, the combination of means for feeding the saw forward a given distance at stated periods, corrector-means to bring the space between two teeth at a given point, notwithstanding the uniform feed and irregular spacing between teeth, an automatically operated vise for gripping the saw after the two sets of operations of the feed and automatic filing means to file the saw teeth between the feeding operations and during the vising operations, substantially as described.

7. In a saw-filing machine, automatic filing mechanism comprising a guide, a slide slidable therein, a file-carrier and a file therein, journaled in said slide to tip, a cam pivoted to the slide and provided with an arm, the said file-carrier being provided with a portion that engages with the cam, a spring for holding such portion in engagement with the cam, a trip-setting cam, a pair of trips, and connections between the trips and trip-setting cam, whereby when the trips are set and the slide is operated, they serve to engage with the arm of the cam pivoted to the slide and thereby shift the cam to tip the file-carrier or return the file-carrier from tipped relation, substantially as described.

8. In a saw-filing machine, filing mechanism comprising a slide, a cam shaft, connecting means for communicating the rotative movement to reciprocatory movement of the slide, a guide for said slide, a file-carrier journaled in said slide to tip, a cam pivoted on said slide and having a protruding arm, a portion of the said file-carrier yieldingly engaging with the said cam, a spring for maintaining that engagement, a pair of trips and intermeshing segments for simultaneously operating the trips, a trip-setting cam having diametrically raised portions on its periphery and attached to the cam shaft, a lever arm yieldably bearing against the periphery of the trip-setting cam, and connections between the lever and one of the trips for throwing the trips into the path of the arm of the cam on the slide, whereby at each complete reciprocation of the slide, the trips are set twice, once to tip the file-carrier and once to return the file-carrier from tipped condition, substantially as described.

9. In a saw-filing machine, the combination of a cam-shaft, a feed-cam attached thereto, a feed-dog cam attached to the cam-shaft, a vising cam attached to the cam-shaft, a slide reciprocable by the cam-shaft, a file-carrier supported by the slide so as to tip, another cam on the cam-shaft for causing the tipping action of the file-carrier, feeding mechanism operated by the feed-cam, a corrector-dog operated by the feed-dog cam just after the operation of the feeding mechanism and a vise operated by the vising cam directly after the feed-dog operation, substantially as described.

10. In a saw-filing machine, the combination of a cam-shaft, a feed cam thereon, a feed-dog cam on the cam-shaft, a vising-cam on the cam-shaft, a reciprocable slide reciprocated by the cam-shaft, a file-carrier mounted on the slide to tip, a cam on the cam-shaft for operating the tipping action of the file-carrier, feeding mechanism operated by the feed-cam, another cam on the cam-shaft and connections between such cam and the feeding mechanism for causing the feed mechanism to grip the saw when actuated by the cam, a feed-dog operated by the feed-dog cam directly after the operation by the feed-cam and the cam that causes the gripping of the saw and a vise operated by the vising-cam after the operation of the feed-dog cam, substantially as described.

In testimony whereof, we sign this specification in the presence of two witnesses.

HARRY MICHELS.
FRANK L. LAMOREAUX.

Witnesses:
  STUART C. BARNES,
  VIRGINIA C. SPRATT.

Copies of this patent may be obtained for five cents each, by addressing the "Commissioner of Patents, Washington, D. C."